United States Patent [19]

Harris et al.

[11] Patent Number: 4,873,629
[45] Date of Patent: Oct. 10, 1989

[54] INSTRUCTION PROCESSING UNIT FOR COMPUTER

[75] Inventors: Michael C. Harris, Bedford; David M. Chastain, Plano; Gary B. Gostin, Coppell, all of Tex.

[73] Assignee: Convex Computer Corporation, Richardson, Tex.

[21] Appl. No.: 133,195

[22] Filed: Dec. 15, 1987

Related U.S. Application Data

[63] Continuation of Ser. No. 622,728, Jun. 20, 1984, abandoned.

[51] Int. Cl.$^4$ .......................... G06F 9/26; G06F 13/00
[52] U.S. Cl. .............................. 364/200; 364/243.42; 364/243.6; 364/259.9; 364/261.3; 364/256.4
[58] Field of Search ... 364/200 MS File, 900 MS File

[56] References Cited

U.S. PATENT DOCUMENTS

| | | | |
|---|---|---|---|
| 4,031,517 | 6/1977 | Hirtle | 364/200 |
| 4,086,629 | 4/1978 | Desyllas et al. | 364/200 |
| 4,128,880 | 12/1978 | Cray, Jr. | 364/200 |
| 4,394,725 | 7/1983 | Bienvenu et al. | 364/200 |
| 4,410,941 | 10/1983 | Barrow et al. | 364/200 |
| 4,439,829 | 3/1984 | Tsiang | 364/200 |
| 4,591,972 | 5/1986 | Guyer et al. | 364/200 |

OTHER PUBLICATIONS

Nissen, S. M. & Wallach, S. J., "The All Applications Digital Computer", ACM–IEEE Symposium on High-Level-Language Computer Architecture, Nov. 7 & 8, 1973.

Kogge, P. M., The Architecture of Pipelined Computers, 1981, Chaps. 2, 4 and 6.

Lorin, H., Parallelism in Hardware and Software: Real and Apparent Concurrency, 1972, Chap. 8.

Primary Examiner—Eddie P. Chan
Assistant Examiner—Christina M. Eakman
Attorney, Agent, or Firm—Richards, Harris, Medlock & Andrews

[57] ABSTRACT

A computer (20) is configured for optimizing the processing rate of instructions and the throughput of data. The computer (20) includes a main memory (99), a memory control unit (22), a physical cache unit (100), and a central processor (156). A instruction processing unit (126) is included within the central processor (156). The function of the instruction processing unit (126) is to decode instructions and produce instruction execution commands or directing the execution of the instructions within the central processor (156). Instructions are transferred from the main memory (99) into a register (180) where the address fields of the instructions are decoded to produce a cracked instruction and these instructions are stored in a logical instruction cache (210). As the cracked instructions are selected they are transferred to an output buffer and decoder (214) where the remaining fields of the instructions are decoded to produce instruction execution commands. The instructions in the cache (210) are stored at logical rather than at physical addresses. The cache (210) further can operate at double the rate of a basic clock period for the computer (20) such that a branch instruction can be selected in one clock cycle. The combination of the logical instructiion cache (210) and the concurrent computation of program counts serves to substantially increase the instruction execution rate for the computer (20).

5 Claims, 4 Drawing Sheets

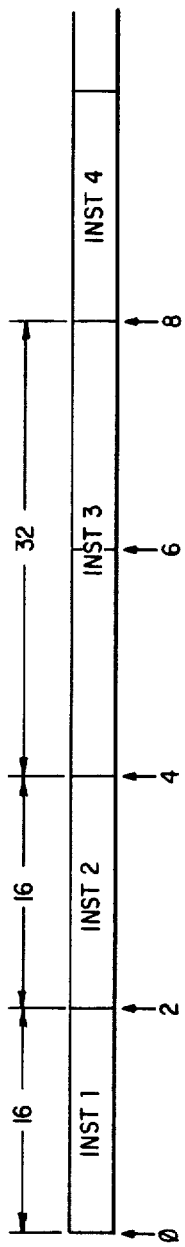

INSTRUCTION PROCESSING UNIT FOR COMPUTER

This application is a continuation of application Ser. No. 622,728, field June 20, 1984, now abandoned.

TECHNICAL FIELD

The present invention pertains to the field of computer technology and in particular to the processing of instructions within a computer.

BACKGROUND ART

A principle design objective in computer technology has been to increase the data processing rate, as well as maximizing the throughput of data. In early computer designs the instructions, which were stored in main memory, were read one at a time from the memory and each instruction was executed before the next instruction was read from memory. However, in typical applications, the memory operates at a much slower rate than the central processor which executes the instructions. Therefore, the processing of instructions is slowed substantially if there must be a wait to obtain each instruction.

As a result of the recognition of this delay in retrieving instructions, there have been developed instruction caches, in which a block of instructions are read from the main memory and stored in a small, high speed memory so that they can be quickly provided to the central processor. Such an instruction cache is shown in Peter Kogge, "The Architecture of Pipelined Computers," McGraw-Hill, 1981.

Although the use of an instruction cache does increase the operand processing rate, its effectiveness depends upon the execution of sequential instructions. Substantial delay can be encountered in such systems when the computer executes a branch away from sequential instructions. When a branch is encountered, the address of the branch instruction must be calculated. The branching of the instruction path typically invalidates all of the instructions which were stored in the cache. When this occurs, there must be a retrieval of an entire block of instructions to refill the cache and resume the execution of instructions.

The problem of branching in the use of instruction caches has been discussed in the literature, such as in the book to Kogge referenced above.

Despite the work that has been done regarding the use of instruction caches and the problem of branching, there remains a substantial difficulty in preventing the loss of processing time when such a branch is encountered. The present invention provides a method and apparatus for handling the branching problem so that the majority of branches (conditional and unconditional) are executed in one clock cycle.

SUMMARY OF THE INVENTION

A selected embodiment of the present invention comprises an instruction processing unit for use in a computer which has a main memory and a central processor wherein the instructions for execution by the computer include address fields and are stored in the main memory. The instruction processing unit includes circuitry for decoding selected fields of the instructions, which are received from the main memory, to produce cracked instructions. The cracked instructions include selected fields which are decoded from the original instruction together with other fields which are not decoded. An instruction cache is provided for storing the cracked instructions. Circuitry responsive to the central processor selects one of the cracked instructions stored in the instruction cache. Further circuitry is provided for decoding the selected, cracked instruction to produce instruction execution commands wherein at least a portion of the commands are transmitted to the central processor for directing the execution of the selected instruction.

In a further aspect of the present invention the selected fields of the instructions comprise address fields. In a still further aspect of the present invention, the instructions stored in the main memory are referenced by physical addresses, while the instructions used by the central processor and stored in the instruction cache are referenced by logical addresses.

BRIEF DESCRIPTION OF THE DRAWINGS

For a more complete understanding of the present invention and the advantages thereof, reference is now made to the following detailed description taken in conjunction with the following drawings in which:

FIG. 3 is an illustration of an instruction stream; and

FIG. 4 is an illustration of the storing of cracked instructions in the instruction cache shown in FIG. 2.

DETAILED DESCRIPTION

The present invention comprises an instruction processing unit for a computer. This unit includes an instruction cache and circuitry for accelerating the execution of instructions. The instruction processing unit of the present invention further addresses the problem of branching and offers a solution in which a branch can be accomplished typically in one clock cycle.

Figure 1A:
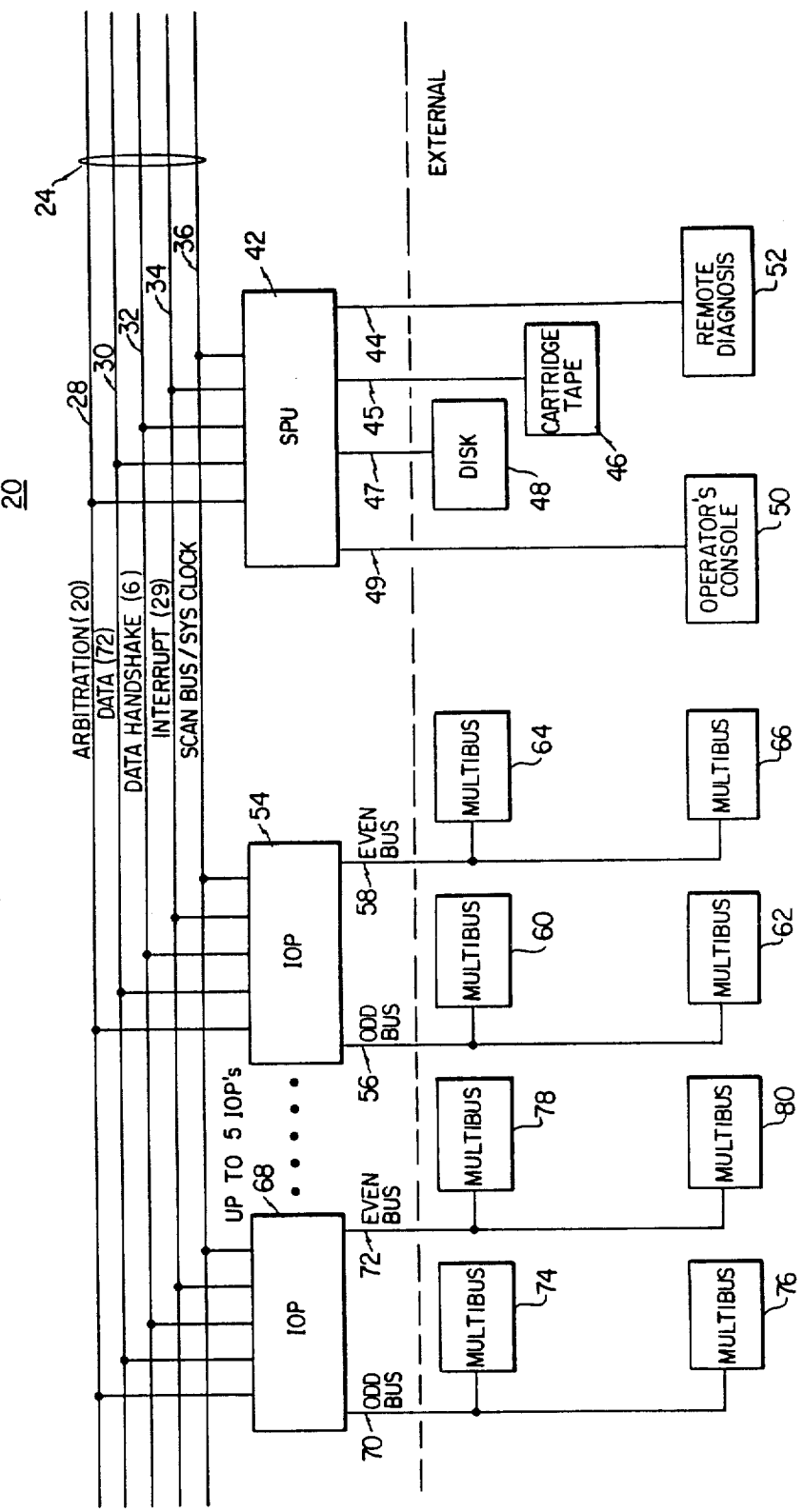
FIGS. 1A and 1B are overall block diagrams illustrating the functional units of a computer which utilizes the present invention and also shows the data flow between the functional units.
Figure 1B:
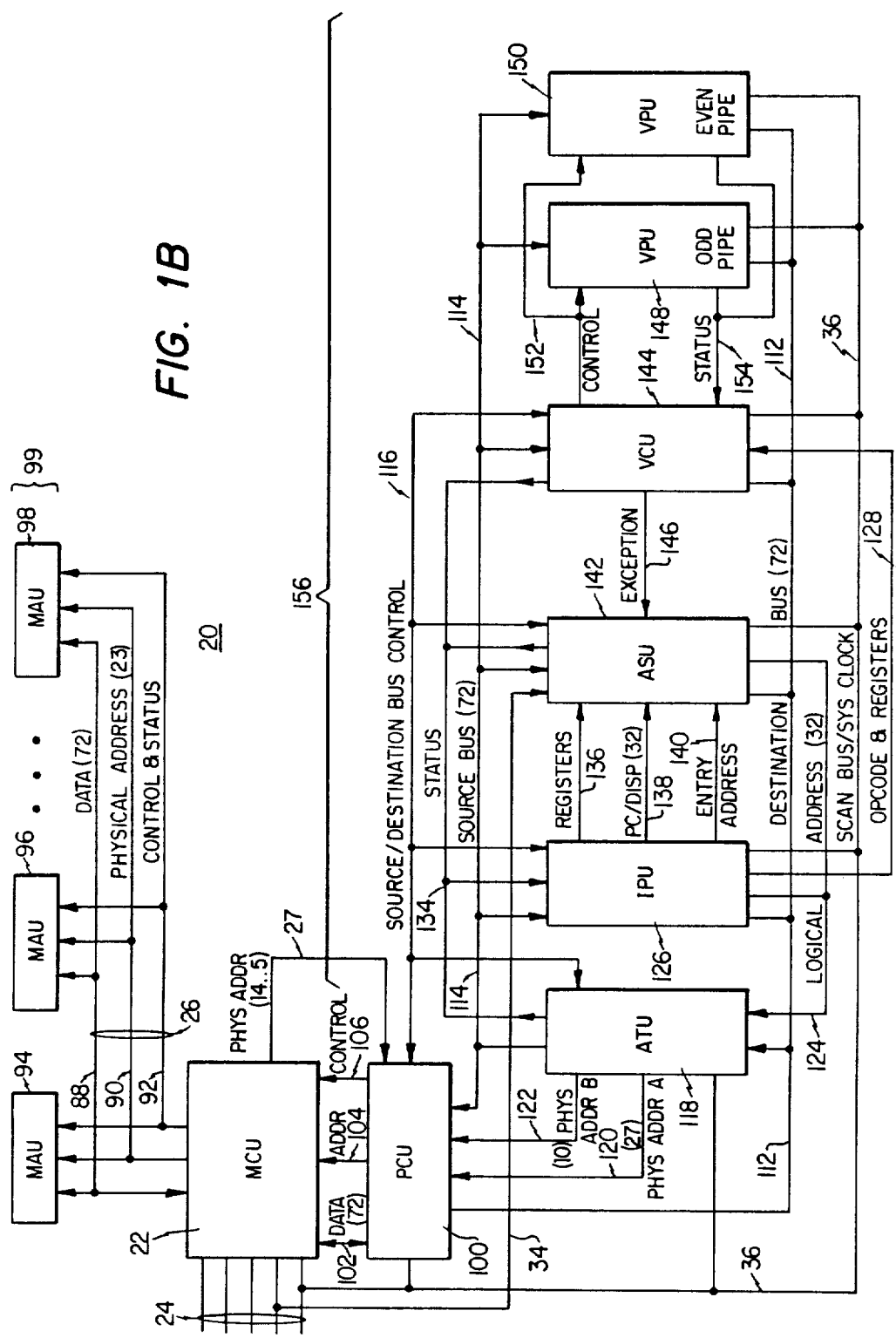

The present invention is used within a computer which is designed to maximize data throughput and increase data processing in numerous aspects. Referring now to FIGS. 1A and 1B, there is illustrated a functional block diagram for a vector processing computer which is referred to by the reference numeral 20. In a first step of the description, each of the functional blocks is defined together with the basic operand and control flow between the functional blocks. This is followed by an operational description of the computer 20 in reference to the overall block diagram. Following the operational description of the computer there is a detailed configuration and operational description for the instruction processing unit of the present invention.

The computer 20 has a hierarchical memory in which operands and instructions are identified at the execution level by logical addresses, which cover the full range of addresses used within the application program. However, in many instances the actual main memory used in the computer is substantially smaller than the range of logical addresses used in the application program. The addresses used by the main memory and certain caches within the computer 20 are termed physical addresses. Since the logical addresses cover a greater span than the physical addresses, the logical addresses have a greater number of bits to define the address. As described herein there is frequently a requirement to translate logical addresses into corresponding physical addresses. The method of translation and units involved in such translation are described below.

The central element for data flow through the computer 20 is a memory control unit (MCU) 22. A multi-line bus 24 (PBUS) is connected for transmitting and receiving operands, control and other signals with the memory control unit 22. A second multi-line bus 26 (MBUS) is also connected to the memory control unit 22. A physical address line 27 transmits addresses from unit 22 to a physical cache unit, described below.

Bus 24 comprises a plurality of lines including an arbitration line 28 (20 bits), a data line 30 (72 bits), a handshake line 32 (6 bits), an interrupt line 34 (29 bits) and a scan bus/system clock line 36. Even though the figures herein show a single line, each line may comprise a plurality of parallel paths, such as 20 parallel paths for the arbitration line 28.

A service processing unit (SPU) 42 is connected in parallel with each of the lines comprising bus 24. The service processing unit 42 is connected to several units of peripheral equipment which are external to the computer 20. These include a battery backup clock 44 connected through a line 43, a cartridge tape 46 connected through a line 45, a disk 48 connected through a line 47. An RS232 interface line 49 from SPU 42 is connected to an operator's console 50 and a remote diagnosis unit 52.

At least one input/output processor (IOP) 54 is connected in parallel to the bus 24. The input/output processor 54 provides a plurality of input and output data paths for connecting the computer 20 to user devices such as disk and tape bulk storage. The input/output processor 54 has an odd bus 56 and an even bus 58. For each of these buses there may be connected thereto a plurality of standard multibus units such as 60 and 62 which are connected to the odd bus 56 and units 64 and 66 which are connected to the even bus 58.

In the system configuration of the computer 20 there may be connected up to five input/output processors similar to the processor 54. A second such input/output processor is indicated by reference numeral 68 having an odd bus 70 and an even bus 72. Multibus units 74 and 76 are connected to the odd bus 70 while multibus units 78 and 80 are connected to the even bus 72.

The bus 26 comprises a plurality of lines including a data line 88 (72 bits), a physical address line 90 (23 bits) and a control and status line 92. The 72 bits for data line 88 comprise 64 bits for operands and 8 bits of parity. The bus 24 serves to connect the memory control unit 22 to at least one memory array unit 94. Additional memory array units, such as 96 and 98, may be connected in parallel to the bus 26. A minimum configuration of the computer 20 requires at least one memory array unit and can utilize as many as 8 memory array units. The set of memory array units 94, 96 and 98 comprises a main memory 99 for the computer 20.

The computer 20 further includes a physical cache unit (PCU) 100 which is connected to the memory control unit 22 through a data line 102 (72 bits), an address line 104 and a control line 106. The physical cache unit 100 serves principally as a high speed cache memory. The physical cache unit 100 transmits and receives operands from the main memory 99 via the memory control unit 22. Operands are also transmitted from the physical cache unit 100 through a destination bus 112 (72 bits) to a source bus 114 (72 bits) which is also connected to transfer operations into the physical cache unit 100. Control signals for regulating the flow of operands through the source and destination buses is transmitted through a bidirectional source/destination bus control line 116 which is connected to the physical cache unit 100.

An address translation unit (ATU) 118 is connected to both receive operands through the destination bus 112 and transfer operands to the source bus 114. The address translation unit 118 produces two physical addresses which are transmitted through a first physical address A line 120 (27 bits) and through a second physical address B line 122 (10 bits). Both of the lines 120 and 122 are connected to provide physical addresses to the physical cache unit 100. The address translation unit 118 is further connected to the source/destination bus control line 116. Logical addresses are provided to the address translation unit 118 via a logical address bus 124 (32 bits).

An instruction processing unit (IPU) 126 in accordance with the present invention is connected to both the destination bus 112 and the source bus 114. For control purposes the instruction processing unit 126 is further connected to the source/destination bus control line 116. Logical addresses generated by the instruction processing unit 126 are transmitted through the logical address bus 124. The instruction processing unit 126 produces opcode instructions together with register information which is transmitted through an opcode and registers bus 128. Status information is provided to the instruction processing unit 126 through a status bus 134.

The instruction processing unit 126 further produces register information which is transmitted through a registers line 136, produces a program count (PC) and program count displacement information which is transmitted through a PC/DISP line 138 (32 bits) and produces an entry address which is transmitted through entry address line 140.

An address scalar unit (ASU) 142 principally serves to execute scalar instructions, control vector length and vector stride manipulation, and generate logical addresses. The lines 136, 138 and 140 from the instruction processing unit 126 are input to the address scalar unit 142. Both the destination bus 112 and the source bus 114 are connected to the address scalar unit 142. Interrupt information is further transmitted and received by the address scalar unit 142 through the interrupt line 34. Control information for the source and destination buses is conveyed to and from the address scalar unit 142 through the source/destination bus control line 116. The address scalar unit 142 further generates status information which is transmitted through the status line 134.

In response to each instruction, the instruction processing unit 126 produces register instructions and an entry address for the address scalar unit 142 together with opcode and register information for a vector control unit (described below).

A vector control unit (VCU) 144 is connected to both the destination bus 112 and the source bus 114 as well as the source/destination control bus line 116. The vector control unit 144 receives opcode information and register assignments through line 128 from the instruction processing unit 126. The vector control unit 144 further generates status information which is transmitted through the status line 134. When certain processing problems arise within the vector control unit 144, such as a floating point overflow, an exception command is generated and transmitted through an exception line 146 to the address scalar unit 142.

The high speed vector processing of data is carried out in the computer 20 by use of identical vector processing units (VPU) 148 and 150. Unit 148 is termed the odd pipe and unit 150 is termed the even pipe. A vector processing unit appropriate for use in the present invention is described in the Kogge book referenced above. Both the destination bus 112 and the source bus 114 are connected to the vector processing units 148 and 150 for receiving and transmitting operands. The vector control unit 144 produces control commands which are transmitted through a control line 152 to both of the vector processing units 148 and 150. Status information is produced by both of the units 148 and 150 and the status information is transmitted through a status line 154 to the vector control unit 144.

The scan bus/system clock line 36 originates in the service processor unit 42 and extends for connection to each of the input/output processors, such as 54 and 68, the memory control unit 22, the physical cache unit 100, the address translation unit 118, the instruction processing unit 126, the address scalar unit 142, the vector control unit 144, and the vector processing units 148 and 150. The service processing unit 42 transmits the system clock through line 36 to synchronize the operation of each of the units in computer 20. Unit 42 also operates through line 36 to diagnose the operation of each of the units connected to line 36.

The collection of units comprising the address translation unit 118, the instruction processing unit 126, the address scalar unit 142, the vector control unit 144 and the vector processing units 148 and 150 is termed the central processor for the computer 20 and is designated by the reference numeral 156. However, the data cache located in the address translation unit 118 serves as a memory and is therefore not necessarily a part of the central processor 156.

The basic operation of the computer 20 is now described in reference to FIGS. 1A and 1B. Following this overall description, the physical configuration and function is described for the instruction processing unit 126 used within the computer 20.

The first step in the operation of the computer 20 is termed initialization. When power is first turned on, there is no valid data or instructions in any of the memory locations or registers of the computer 20.

The initialization of the computer 20 is carried out by the service processor unit 42. In a first step the various registers and status bits throughout the computer 20 are set to an initial state to eliminate the random status that occurs during powerup.

In the next step a command is input through the operator's console 50 to transfer the operating system for the central processor 156 from the disk 48 into the main memory 99 which includes the memory array units 94, 96 and 98. The operating system travels from the disk 48 through the service processor 42, the bus 24 and the memory control unit 22 into the main memory 99.

As a further part of the initialization, microcode is loaded into random access memory (RAM) in various control stores within the central processor 156, specifically into control stores in the address scalar unit 142 and the vector control unit 144. After the initialization and the loading of the operating system, the service processor unit 42 initiates instruction execution in the job processor 156. This is accomplished by setting the program counter, which is within the instruction processing unit 126, to a preselected program count. This starts the program execution.

As the first step, the instruction processing unit 126 seeks the first instruction to execute. An instruction cache, described in further detail below, is provided within the instruction processing unit 126. Since the first instruction cannot be in this cache, because the computer 20 has just been initialized, a request must be made to main memory 99 for the instruction. The instruction processing unit 126 generates a request to main memory by supplying a logical address through the logical address bus 124. The logical address produced by unit 126 is transmitted via bus 124 to the address translation unit 118 which produces the corresponding physical address. The resulting physical address is transmitted through line 120 to the physical cache unit 100.

If the requested instruction at the specified physical address is not within the physical cache unit 100, the physical address is passed through line 104 to the memory control unit 22. The physical address is then passed to the main memory 99 where the desired instruction is retrieved, typically within a block of instructions, and passed through the data line 88, the memory control unit 22, line 102, and to the physical cache unit 100. The block of instructions thus produced are passed through the physical cache unit 100, the destination bus 112, through the address translation unit 118 to the source bus 114. From bus 114 the instructions are delivered to the instruction processing unit 126 where the requested instructions are stored within an instruction cache. The desired instruction can then be decoded where it initiates either the address scalar unit or the vector control unit or both to carry out the steps of the selected instruction.

The above example is typical for the fetching of an instruction. A description is now presented for the execution of a load scalar instruction. The primary decoding is carried out by the instruction processing unit 126. As a result of the decoding, register information concerning the use of the registers within the address scalar unit 142 is transmitted over the registers line 136. Since the load instruction requires retrieving information from either main memory 99, physical cache unit 100 or the logical cache within unit 126, a logical address is directed from the instruction processing unit 126 through the logical address bus 124 to the address translation unit 118 which produces a corresponding physical address. This physical address is transmitted through lines 120 or 122 to the physical cache unit 100. If operands for the requested logical address are not stored in a logical cache contained within the ATU unit 118, the physical address is next transmitted to the physical cache unit 100. If operands for the requested physical address are stored within the physical cache unit 100, they are immediately retrieved from the cache unit 100 and transmitted through the destination bus 112, through the address translation unit 118 to the source bus 114 for delivery to the address scalar unit 142 into the selected registers. If the requested data is not in the physical cache unit 100, the physical address is passed through the memory control unit 22 to the main memory 99 where the desired operands are read and returned through the memory control unit 22, the physical cache unit 100 to the destination bus 112, through the address translation unit 118 to the source bus 114 for delivery to the address scalar unit 142. Within the address scalar unit 142 the retrieved information is processed as required by the executed instruction.

Figure 2:
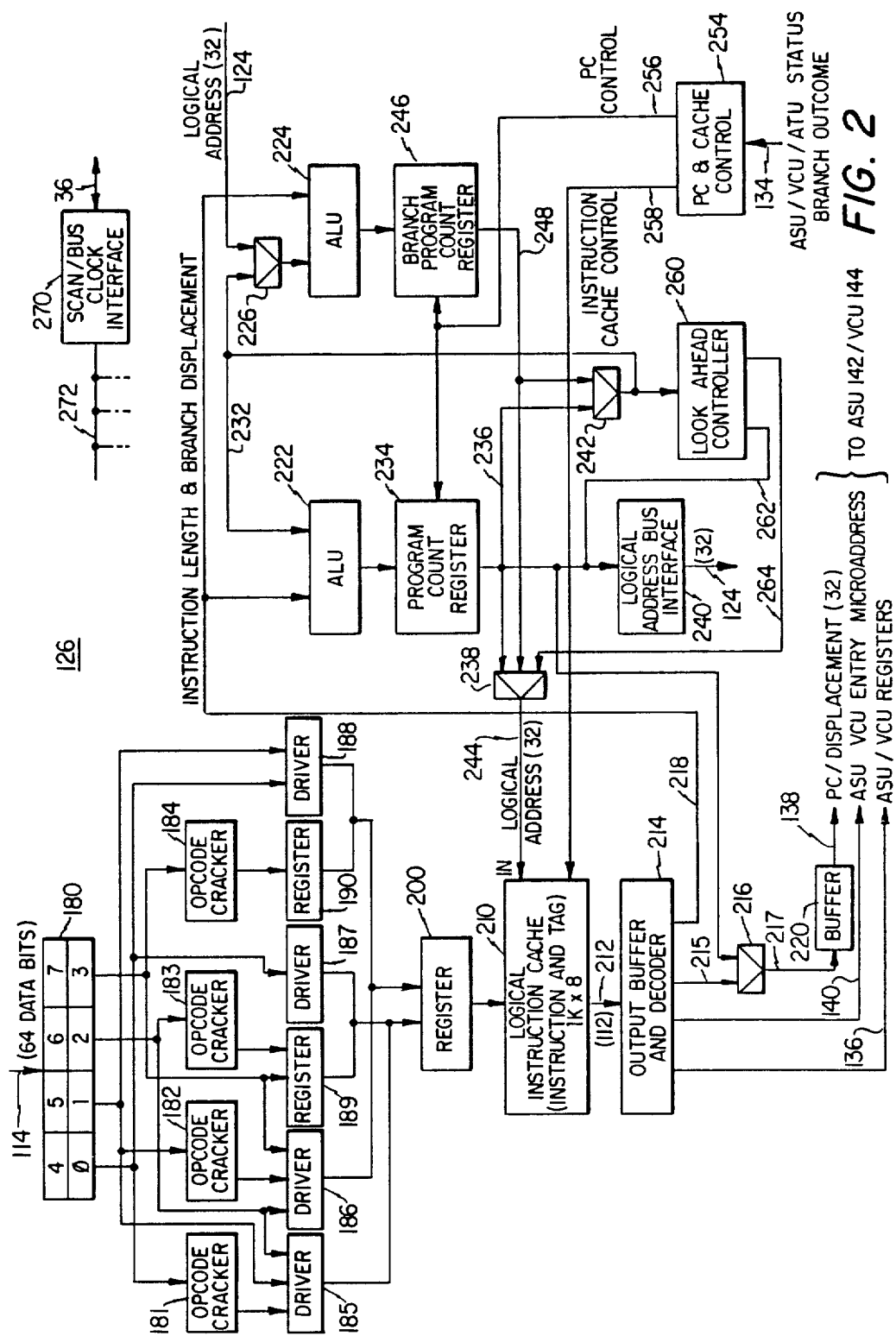
FIG. 2 is a block diagram illustrating the instruction processing unit (IPU) of the present invention which is shown as a functional block in FIG. 1B.

The instruction processing unit 126 in accordance with the present invention, which is shown in FIG. 1B, is illustrated in a detailed block diagram in FIG. 2. The instruction processing unit 126 decodes all machine instructions and provides the initial control information for the instruction execution to be completed. The source bus 114 provides instructions, which are received directly from the main memory 99, to a register 180. The register 180 holds the 64 data bits which are received from the bus 114. The 64 data bits are stored in 8 byte locations which are numbered 0 through 7 from left (most significant) to right (least significant). The higher 4 bytes 0–3 are processed first. The various bytes of instruction from register 180 are transferred to opcode crackers 181, 182, 183 and 184. It further includes drivers 185, 186, 187 and 188 together with registers 189 and 190.

Byte 0 of register 180 is provided to the opcode cracker 181 and the drivers 187 and 188. Byte 1 of the register 180 is provided to opcode cracker 182 and drivers 185 and 188. Byte 2 of register 180 is provided to opcode cracker 183 and drivers 185 and 186. Bytes 3 of register 180 is provided to opcode cracker 184 and driver 186 as well as register 189. Bytes 4, 5, 6 and 7 are subsequently shifted into the respective locations for bytes 0, 1, 2 and 3.

The output of opcode cracker 181 is provided to driver 185, the output of opcode cracker 182 is provided to driver 186, the output of opcode cracker 183 is provided to register 189 and the output of opcode cracker 184 is provided to register 190.

The output of driver 185 is provided to a register 200. The output of driver 186 is also provided to register 200. The outputs of register 189 and driver 187 are transmitted to the register 200. Also the outputs of driver 188 and register 190 are transmitted to register 200.

Register 200 accumulates each of the decoded (cracked) instructions and transfers the accumulated group to a logical instruction cache 210.

The cracked instructions thus produced are stored in a logical instruction cache 210. The cache 210 includes both the cracked instruction and the corresponding address tag. The address tag is subsequently used as part of the instruction lookup sequence.

Selected instructions are read from the cache 210 and transmitted through a line 212 (112 bits) to an output buffer and decoder 214. The cracked instructions are decoded in the buffer and decoder 214 in a conventional manner to produce instruction execution commands which are transmitted through lines 136, 140, 215 and 218. The design of such a decoder 214 is described in the noted reference above which also describes the opcode crackers 181, 182, 183 and 184.

The line 136 transmits command signals and information to the address scalar unit 142 and the vector control unit 144. This provides information concerning the use of registers within these units. Decoder 214 transmits entry microaddresses through line 140 to the address scalar unit 142 and the vector control unit 144 for initiating microroutines within these units.

Decoder 214 produces further decoded program count and displacement information which is transmitted through line 215, a switch 216 and a line 217 to a buffer 220 which conveys the information to line 138.

Instruction length and branch displacement information produced by the decoder 214 is transmitted through the line 218 to the first inputs of arithmetic logical units 222 and 224.

The logical address line 124 is connected to provide a first input to a switch 226 which has the output thereof directed to the second input of the logical unit 224. A line 232 provides a second input to the logical unit 222 and a second input to the switch 226.

The logical unit 222 produces a sequential program count which is stored in a program count register 234. The program count stored in register 234 is directed through a line 236 to a switch 238, a logical address bus interface 240 and a first input of a switch 242.

The switch 238 directs one of three inputs provided thereto through a line 244 to provide a logical address to the logical instruction cache 210. The logical address bus 124 is connected to the output of the logical address bus interface 240 to transmit logical addresses from the instruction processing unit 126. One of the inputs provided to the switch 242 is directed through the line 232 to the second input of the logical unit 222 and the second input of switch 226.

The logical unit 224 produces a branch program count which is stored in a branch program count register 246. The branch program count stored in the register 246 is transmitted through a line 248 to the second input of the switch 242 and can also be transmitted to the switch 238.

A program count (PC) and cache control 254 receives status signals via line 134 from the address scalar unit 142, the vector control unit 144 and the address translation unit 118. The status signals received through line 134 to the control 254 determine whether the instruction processing unit 126 selects the sequential program count in register 234 or the branch program count in register 246. The program count control signals are transmitted from control 254 through a line 256 to the registers 234 and 246. Instruction cache control commands are transmitted from the control 254 through a line 258 to the instruction cache 210.

A look ahead controller 260, connected to line 232 to receive the output of switch 242, is connected through a line 262 to the interface 240 to transmit logical addresses through the line 124. Controller 260 is also connected through a line 264 to provide a logical address via the switch 238 and line 244 to the instruction cache 210. The function of the controller 260 is to anticipate future requirements for instructions and retrieve blocks of instructions from the main memory 99 prior to use and to store these blocks of instructions in the cache 210.

A scan/bus clock interface 270 is connected to the line 36 to provide initialization, diagnostic and clock signals from the service processing unit 42 to the instruction processing unit 126. These various signals are transmitted through a line 272 to the various units within the instruction processing unit 126.

Referring now to FIG. 3 there is illustrated an instruction stream comprising a series of instructions. In the present embodiment the instructions can have variable lengths. The minimum lengths for an instruction is 16 bits. However, the instruction may also have a length of 32 or 48 bits. The length of the instruction is included as a field within the first 16 bits. In FIG. 3 there are shown four sequential instructions. Instructions 1, 2 and 4 are 16 bits long and instruction 3 is 32 bits long. Thus instruction 1 starts at byte 0, instruction 2 starts at byte 2, instruction 3 starts at byte 4 and instruction 4 starts at byte 8.

Referring now to FIG. 4 there is illustrated the organization of instructions in the cache 210. The instruction layout in FIG. 4 is derived from the instruction stream shown in FIG. 3. Each 16 bit segment in the instruction stream is treated as the leading 16 bits of an instruction even though the selected 16 bits may not be the leading 16 bits of an instruction. In FIG. 4 for byte 0 the instruction 1 is in the initial 16 bit position. The remaining 32 bits are not relevant material and are termed "don't care". The instruction length field for each of the instructions is decoded to determine the length of the instruction and therefore the starting point for the next instruction. The instruction field within instruction 1 is decoded to determine that the overall instruction is only 16 bits long. This means that the following 32 bits are don't care bits.

Instruction 2, starting at byte 2 also occupies the first 16 bits and the remaining 32 bits are don't care bits. For instruction 3, starting at byte 4, there is occupied the first 32 bits of the cache block. The remaining 16 bits are don't care.

The 16 bits starting at byte position 6 are in the middle of instruction 3 and are thus not the leading 16 bits of an instruction. Therefore, all 48 bits following the starting byte 6 are don't care. But starting with byte 8 there is again the leading 16 bits of an instruction, namely instruction 4. This process is continued in this fashion such that each entry in the data cache is a partially decoded and aligned instruction or is complete don't care to be subsequently skipped.

The decoding of various fields in the instruction and the organization of the instructions for storage in the data cache 210 is carried out by the opcode crackers, drivers and registers immediately downstream of the register 180 shown in FIG. 2.

Referring now to FIG. 2, there is presented a further operational description for the instruction processing unit 126. As noted above, a machine instruction is transferred from the main memory 99 into the register 180 where the opcode, register specification and instruction size fields are decoded to produce a cracked instruction and a plurality of cracked instructions are stored in the instruction cache 210 in the manner shown in FIG. 4. The instructions within this cache are referenced by logical, rather than physical, addresses such that they can be retrieved by the central processor 156 without the requirement for address translation. When the central processor 156 requests an instruction, a logical address is transmitted through line 244 into the instruction cache 210 to select one of the instructions stored therein. The selected, cracked instruction is transmitted through line 212 to the output buffer and decoder 214. The remaining fields which have not been previously decoded are then decoded within the decoder 214 to produce the appropriate instruction execution commands for directing the execution of the selected instruction in the central processor 156. The information concerning the address of the next instruction to be executed, such as instruction length and branch displacement is transmitted through line 218 to the logic units 222 and 224.

The logic unit 222 serves the purpose of computing the logical address for the next sequential instruction following the instruction being executed. Basically, it adds the address of the present instruction to the length of the present instruction to produce the address for the next instruction. This sequential program count is then stored in register 234.

The decoded information regarding branching is transmitted through line 218 to the logic unit 224. This unit computes the possible branch address for the next instruction. Particularly, this comprises adding a branch displacement to the address for the current instruction to produce the branch address for the next instruction. The resulting branch address is stored in register 246.

The selection of the next instruction to be executed is determined by the operation of the central processor 156. The execution of each instruction includes operations to determine the address for the next instruction to be executed. This is done primarily within the address scalar unit 142 or the vector control unit 144. The selection for the sequential program count or the branch program count is transmitted as a command through line 134 to the program count and cache control 254. The selected program count is transferred from either register 234 or 246 through the switch 238 into the instruction cache 210 to retrieve the desired next instruction. That instruction is then transferred through line 212 into the output buffer and decoder 214 where the above described sequence is repeated.

The logical instruction cache 210 is designed to have a speed such that it can have both a read and write operation carried out during one major clock cycle for the computer 20. A major clock cycle is, for example, 100 NS and a minor clock cycle is 50 NS. The prior decoding of the address related fields provides the information necessary to have the potential branch address ready if it is selected. The fast operation of the logical instruction cache, relative to the clock cycle period of the computer 20 and the previous decoding of the address fields of the instruction permit a branch instruction to be taken in one major clock cycle. This sharply contrast to prior techniques wherein the selection of a branch address considerably slows the operation of the computer and requires many clock cycles before the branch instruction can be selected and decoded for execution.

The instruction cache 210 is loaded in advance with upcoming instructions by operation of the look ahead controller 260. Since most instructions are used in a sequential order, the instructions can be fetched from main memory 99 in blocks before they are required by the central processor 156. The time saving by use of the logical instruction cache can be substantial. An instruction is typically provided by the cache 210 in one clock cycle which is, for example, 100 nanoseconds. A typical time for retrieving an instruction from main memory is 1.5 microseconds. Thus, if the majority of instructions can be retrieved in advance, the speed of the computer 20 can be significantly enhanced.

The use of a logical address for the instruction cache 210 further provides a speed enhancement since there is no need to translate addresses used by the central processor 156 to retrieve instructions. This is in contrast to the physical cache unit 100 which utilizes physical addresses in referencing the operands stored therein.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope of the invention.

We claim:

1. An instruction processing unit for use in a computer which has a main memory and a central processor wherein instructions for execution by the computer include a plurality of fields wherein at least one of the fields is an address field and the instructions are stored in the main memory, the instruction processing unit comprising:
- means for decoding address fields of instructions received from said main memory to produce cracked instructions which have at least one non-decoded field therein,
- an instruction cache for storing said cracked instructions,
- means for decoding at least one of said non-decoded fields of said cracked instructions received from said instruction cache for producing a plurality of instruction execution commands with at least one of said commands supplied to said central processor for directing the execution of the decoded, cracked instruction,
- a first logic unit connected to receive one of said commands and functioning to compute an address for a next sequential instruction for execution by said central processor,
- means for storing the address for the next sequential instruction which address is produced by said first logic unit,
- a second logic unit connected to receive one of said commands and functioning to compute a branch address for the next instruction for execution by said central processor,
- means for storing the branch address for the next instruction, which address is produced by said second logic unit, and
- means responsive to said central processor for selecting either the stored address for the next sequential instruction or the stored branch address for the next instruction and routing the selected one of the addresses to said instruction cache to read the cracked instruction therein having said selected address, said read, cracked instruction transferred to said means for decoding said cracked instruction.

2. An instruction processing unit as recited in claim 1 wherein said main memory references instructions stored therein with physical addresses and said central processor references instructions with logical addresses, said instruction cache storing said cracked instructions which are referenced by said logical addresses.

3. An instruction processing unit as recited in claim 1 including means for transferring the addresses in both said means for storing to said logic units.

4. A method for decoding instructions in a computer which has a main memory and a central processor wherein instructions for execution by the computer include a plurality of fields wherein at least one of the fields is an address field and the instructions are stored in the main memory, comprising the steps of:
- reading one of said instructions from said main memory,
- decoding address fields of said instruction, which was read from said memory, to produce a cracked instruction which has at least one non-decoded field therein,
- storing a plurality of said cracked instructions in an instruction cache,
- selecting one of said stored, cracked instructions for execution in response to said central processor,
- decoding at least one of said nondecoded fields of said selected, cracked instruction to produce a plurality of instruction execution commands, wherein at least one of said instruction execution commands is supplied to said central processor for directing the execution of the selected, cracked instruction,
- computing an address for a next sequential instruction following said selected, cracked instruction,
- computing a branch address using at least one of said instruction execution commands, the branch address identifying a next instruction for execution following said selected, cracked instruction,
- selecting either the computed address for the next sequential instruction or the computed branch address in response to said central processor;
- routing the selected one of said addresses to said instruction cache to select the corresponding cracked instruction for decoding as said selected, cracked instruction.

5. The method recited in claim 4 wherein said main memory references instructions stored therein with physical addresses and said central processor references instructions with logical addresses, said instruction cache referencing said cracked instructions by use of said logical addresses.

* * * * *